Dec. 17, 1946. C. C. FUERST 2,412,681
CAMERA SHUTTER BLADE OPENER
Filed Jan. 5, 1945 2 Sheets-Sheet 1

CARL C. FUERST
INVENTOR
BY
ATTORNEYS

Dec. 17, 1946.  C. C. FUERST  2,412,681
CAMERA SHUTTER BLADE OPENER
Filed Jan. 5, 1945  2 Sheets-Sheet 2

CARL C. FUERST
*INVENTOR*

BY
*ATTORNEYS*

Patented Dec. 17, 1946

2,412,681

UNITED STATES PATENT OFFICE 2,412,681

CAMERA SHUTTER BLADE OPENER

Carl C. Fuerst, Rochester, N. Y., assignor to Eastman Kodak Company, Rochester, N. Y., a corporation of New Jersey Application January 5, 1945, Serial No. 571,413

9 Claims. (Cl. 95—63)

This invention relates to photography and more particularly to photographic shutters of the between-the-lens type. One object of my invention is to provide a camera shutter which includes a wide range of exposures and which, in addition, includes a means for opening the shutter blades for focusing. Another object of my invention is to provide a shutter operating mechanism for producing normal exposures and to provide a shutter blade opener which may be manually operated without adjusting the regular shutter mechanism for opening the shutter blades for focusing on the ground glass. Another object of my invention is to provide such a mechanism which can be operated only when the shutter is set and in condition for exposure. A still further object of my invention is to provide a shutter blade opener in which there is a spring tending to return the opener to a normal position, said opener including a light spring tending to hold the blades closed while the shutter is in a set position. A still further object of my invention is to provide a device which exerts a slight closing action on the shutter blades, which closing action is readily overcome by the shutter leaf moving mechanism of the shutter. Other objects will appear from the following specification, the novel features being particularly pointed out in the claims at the end thereof.

In shutters such as those used particularly on cameras designed to take sheet film, film packs and plates, it is often desirable to focus on a ground glass by manually opening the shutter leaves by a supplementary mechanism which does not require any adjustment of the shutter timing lever to accomplish the desired end. In cameras of the reflex type and which employ a between-the-lens type of shutter, sometimes known as front shutter reflex cameras, it is also desirable to have a shutter in which there is a means for opening the shutter blades independently of the shutter setting mechanism because it is desirable to have a structure in which the lowering of a mirror can open the shutter blades. My present invention is particularly directed to shutters for the above types of cameras, although obviously the shutter blade opener may be used for any desired purpose.

I am aware that shutter openers have been provided by which blades may be opened without adjusting the shutter mechanism, a typical example of such a shutter being shown in Patent 2,249,540, Riddell, granted July 15, 1941. My present invention is for an improvement over the structure shown in this patent and over shutters employing different forms of openers which are known. I provide a shutter opener which can be turned through a relatively few degrees to open the shutter blades when the shutter is in a set position and in addition this shutter opener also serves as a light spring tending to hold the shutter blades closed while the shutter is in a set position, thereby overcoming a difficulty which may exist with some shutters—that is a difficulty which occurs when certain types of shutters are set which permits a sudden jar to cause the shutter blades to oscillate a very slight distance sometimes permitting light to enter.

Coming now to the drawings wherein like reference characters denote like parts throughout:

My invention comprises broadly providing a shutter blade opener which may be manually operated when the shutter is in a set position to open and close the shutter blades independently of any adjustment to the shutter setting mechanism. I prefer to provide an opener having the general shape of a Geneva gear or Geneva stop but not being exactly either one of these. The Geneva movement which I prefer to use permits two parts to turn together during a portion of the movement of one part and it permits one part to slide during another part of the movement of one of the parts and to this extent it may be called a Geneva-like movement. I prefer to utilize a shutter operating mechanism of the type shown in my copending application, Serial No. 549,529, entitled "Photographic shutter," filed August 15, 1944, because this shutter mechanism is particularly suitable for my improved type of shutter blade opener. However, it will be obvious that such an opening device may be used with other types of shutter mechanism if desired.

Figure 1:
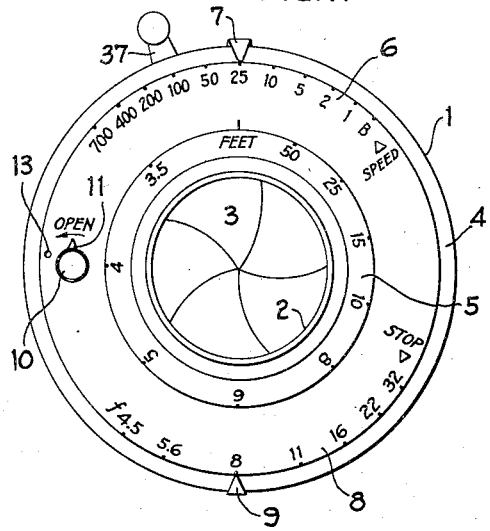
Fig. 1 is a top plan view of a shutter including a shutter blade opener constructed in accordance with and embodying a preferred form of my invention.

Fig. 1 shows a preferred embodiment of my invention. The shutter designated broadly as 1 is provided with an aperture 2 through which light passes to make an exposure, or for focusing, when the shutter blades 3 open. In the form shown a cover 4 lies over the casing enclosing the mechanism. A lens focusing ring 5 may be used and there is an exposure scale 6 over which the adjusting lever 7 may turn and a diaphragm scale 8 over which the diaphragm pointer 9 may turn. In accordance with my invention a knob 10 is mounted on the shutter cover 4, this knob having a pointer 11. Pointer 11 preferably includes a "pimple" or protuberance 12 adapted to snap into a "dimple" or recess 13 for holding the shutter leaves 3 in an open position if desired. However; the pimple and dimple latch elements are not necessary and may be omitted.

Figure 2:
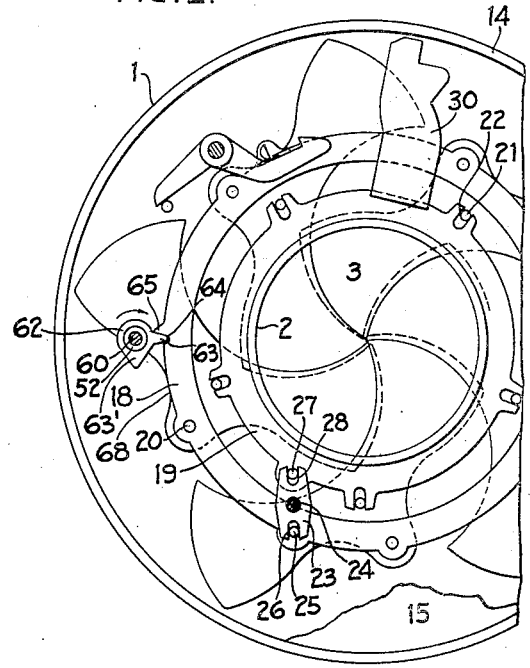
Fig. 2 is a fragmentary top plan view of the shutter shown in Fig. 1 on a somewhat enlarged scale with the shutter cover operating mechanism and other parts removed to show the shutter blade structure. The parts are shown with the shutter in a set position.
Figure 7:
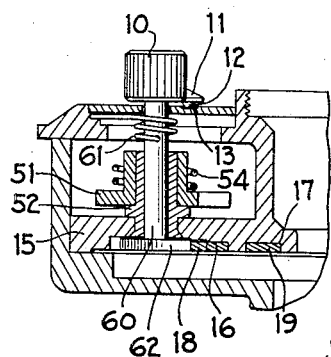
Fig. 7 is an enlarged fragmentary detailed section on line 7—7 of Fig. 4.
Figure 3:
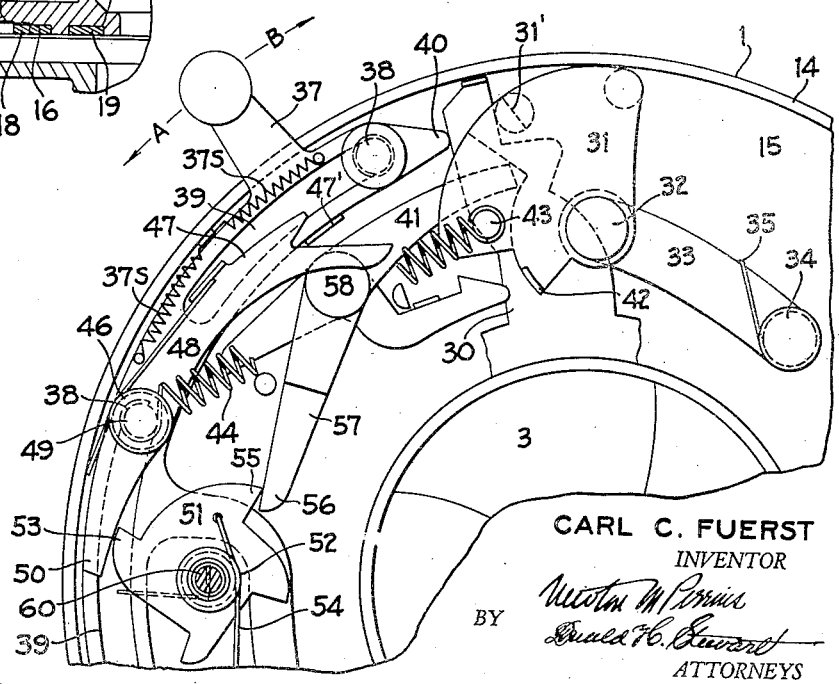
Fig. 3 is a considerably enlarged top plan view of a shutter leaf driving mechanism to which my shutter blade opener may be readily attached.

While my shutter blade opener may be applied to various types of shutters as is obvious to one skilled in the art, I have illustrated on a preferred type of shutter shown in my copending application above referred to. This shutter includes the casing 1 which, as best shown in Figs. 2 and 3, the casing may include an upstanding flange 14 about its periphery and a mechanism plate 15. This plate 15 may include annular slideways 16 and 17 for, in this instance, a pair of blade rings 18 and 19.

Each shutter blade 3 is symmetrical in shape and is operably connected to the blade rings. Each blade has a pivotal connection at 20 with blade ring 18, and a pin 21 and slot 22 connection with blade ring 19. Since a rocker arm 23 is pivoted at 24 between the blade rings and since the rocker arm includes a pin 25 and slot 26 connection with blade ring 18 and a similar pin 27 and slot 28 connection with blade ring 19, movement of the blade ring both opens and closes the shutter blades 4. Both blade rings move together. Consequently movement of the leaves occurs when either ring is moved.

In order to make an exposure one blade ring, here shown as 19, includes an arm 30 extending from the ring in a generally radial direction. This arm 30 lies in the path of a pin 31' carried by a master member 31 pivoted at 32 to a link 33. Link 33 is carried by a stud 34 on mechanism plate 15 and a spring 35 tends to move the master member link in a counterclockwise position against a stop (not shown).

A single lever 37 serves both as a trigger and setting lever. When moved in the direction of arrow A (Fig. 3) the shutter is released and when moved in the direction of arrow B the shutter is set. Fig. 3 shows parts in released position and Fig. 2 in set position. In setting, lever 37 moves about the pins 38 and slots 39 connection with the mechanism plate 15 so that the nose 40 engages arm 30 and moves it (and master member 31) to a set position. During this movement a latch 41 snaps behind a lug 42 on the master member holding the latter in a set position. Springs 37s hold lever 37 normally in an intermediate position of rest.

The master member 31 is attached at 43 to a power spring 44 anchored at its opposite end 45 to a stud 46. When set as in Figs. 2 and 4, to release, lever 37 is moved in direction of arrow A (Fig. 3). Lug 47' through arm 47 of lever 48 moves the lever about its pivot 49. This releases lever arm 50 from the ratchet-like member 51 carried by the sleeve stud 52. Tooth 53 is engaged by lever arm 50 when the shutter is set. A spring 54 normally turns ratchet-like member 51 clockwise when released so that tooth 55 may strike the end 56 of a lever 57 pivoted at 58 and carrying the latch 41. Thus the master member 31 may be released.

As thus far described the shutter mechanism is identical to the showing in my copending application, Serial No. 549,529, and reference may be had to this application for a further and detailed description of the shutter mechanism. However, this is not necessary for a complete understanding of my present invention.

Figure 4:
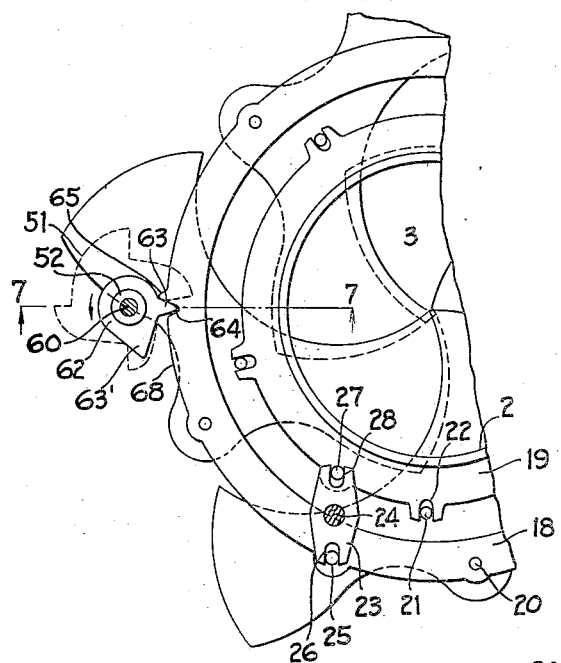
Fig. 4 is a fragmentary view showing the blade opener and associated parts in a set position, the shutter blades, blade rings and opener being shown on an enlarged scale and certain parts being shown in section.
Figure 6:
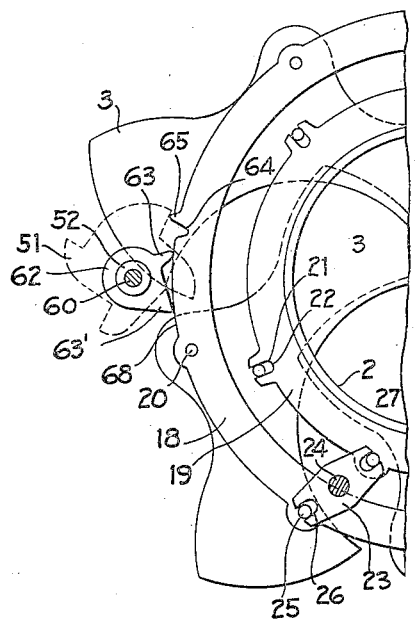
Fig. 6 is a view similar to the preceding views but with the parts in the position they assume after the shutter has been tripped.
Figure 5:
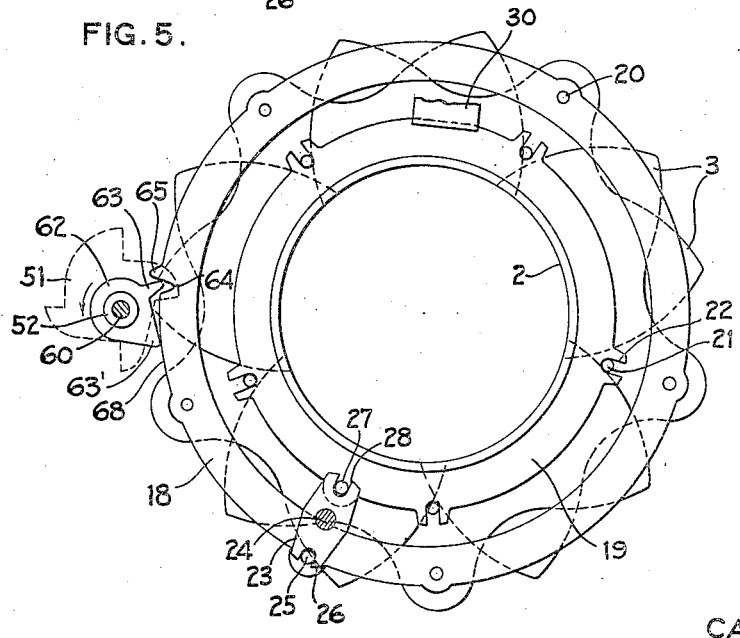
Fig. 5 is a view substantially similar to Fig. 4 but with the shutter parts in a position which they assume after the shutter has been released and the shutter blades are in an open position.

Coming now to my present invention, the shutter blade opener may consist of the knob 10 as above described, this knob being carried by a shaft 60 passing through the sleeve stud 52 supporting the ratchet-like member 51. A spring 61 tends to turn this shaft in a clockwise direction. The knob 10 is pinned to one end of the shaft 60 and on the other end, a Geneva-like driver 62 is affixed. This driver carries a single tooth 63 and an abutment or formation 63' spaced therefrom as shown in Figs. 4 to 6. Tooth 63 is adapted to engage notch 64 and tooth 65 of blade ring 18 and, when the latter is in the set position of Fig. 4 a slight turn of knob 10 may turn the blade rings from the Fig. 4, set position, to the Fig. 5, open position. The spring 61 tends to hold the blades 3 closed through the engagement of tooth 63 and tooth 65 and notch 64. However, the "pimple" and "dimple" 12 and 13 may snap together to hold the blades open.

Returning knob 10 to its Fig. 4 position may be done manually or by the spring 61. When so positioned the blade rings may be moved by the shutter mechanism in which case the Geneva-like driver 62 may turn until the tooth 63 and spaced abutment 63' both may slide on the surface 68 so that the knob 10 no longer turns. This movement occurs when the parts move to and from the position of rest, shown in Fig. 6, which is reached after an exposure is completed.

It should be noticed that the Geneva-like driver 62 and the blade ring 18 with its tooth 65 and notch 64 are quite similar to a Geneva gear or Geneva stop but are not identical to either. Part 18 is adapted to oscillate. During a part of this movement the driver 62 turns and during another part of the oscillation the driver slides without turning. This is a useful feature of my invention since it permits the driver spring 61 to exert a light closing pressure on blade ring 18 when the parts turn together, and affords a minimum of braking action on the blade ring when the blade ring 18 turns and the driver 62 slides (as in Fig. 6).

The operation of my invention is simple. Assuming an operator wants to focus, he tries to turn knob 10. If it does not turn, because prevented by the Fig. 6 position, he cannot open the shutter blades 3 and this notifies him the shutter is in a position of rest and is not ready for an exposure; in other words that the shutter is not set. He then moves handle 37 in B direction, Fig. 3, setting the shutter and moving the parts to the Fig. 4 position. Again trying handle 10 he finds it turns opening the shutter blades 3 while parts move from Fig. 4 to Fig. 5 positions. He may cause snap latch elements 12 and 13 to engage while focusing. A reverse turn of the knob 10, closes blades 3 and the shutter is ready for an exposure. Since none of the adjustments for adjusting shutter speed, focusing, or diaphragm opening have been altered in focusing the exposure can be made immediately. The shutter has to have been previously set because otherwise the blade could not have been opened for focusing.

Thus my invention provides a simple blade opener for focusing. It serves to remind an operator the shutter is set for an exposure, and it provides a light tension on the shutter blade 3 tending to prevent these blades from being accidentally opened while in a set position. At the same time it offers but little resistance to the shutter operating mechanism in making a normal exposure, so that high speed exposures are not impaired.

I claim:

1. In a camera shutter including a casing, blades movably mounted in the casing, a blade ring operably connected to the blades, mechanism for moving the blade ring, the combination with said blades and blade ring, of a supplemental blade-opening device including a pivotally-mounted blade opener, a tooth and an abutment thereon, said blade ring including a tooth-shaped formation for engagement with the tooth on the blade opener to be moved thereby, said blade ring adjacent the tooth having an arcuate surface with which the abutment on the blade opener may engage and slide when the tooth on the opener disengages the tooth on the blade ring whereby the blade ring may slide with respect to the blade opener.

2. A shutter as defined in claim 1 characterized by a shutter operating mechanism powered by a spring adapted to be set for tensioning the spring, and in which the blade opener and blade ring interengaging Geneva gear type of connection is positioned to turn together when said shutter mechanism spring is set.

3. A shutter as defined in claim 1 characterized by an operating handle outside of the shutter casing operably connected to the blade opener for manually operating the latter.

4. A shutter as defined in claim 1 characterized by an operating handle outside of the shutter casing operably connected to the blade opener for manually operating the latter, the blade opener tooth and abutment and blade ring being adapted to prevent operation of said handle when the blade opener and blade ring are positioned in sliding relationship, one with the other.

5. A shutter as defined in claim 1 characterized by a blade opener spring biased in a direction to tend to hold the blade ring in a blade closing direction when said blade opener and blade ring are in a mutually turning relationship.

6. In a camera shutter including a shutter casing, a blade ring oscillatably mounted therein, shutter blades movably attached thereto and mechanism for operating the blades, the combination with said blade ring, shutter blades and operating mechanism, of a tooth-shaped formation on the blade ring, a blade ring opener for opening said blade ring through said tooth-shaped formation including a member having a single tooth with an abutment spaced therefrom, positioned to both turn with and slide on said blade ring, a single tooth of the blade opener being adapted to engage a tooth-shaped formation on the blade ring when the latter is in a predetermined position to turn therewith, a handle outside the shutter casing and connected to the blade opener for turning the latter when the blade ring is in a predetermined position in which the tooth-shaped formation on the blade ring engages the single tooth of the blade ring opener, whereby the shutter blades may be opened independently of the mechanism for operating the shutter.

7. In a camera shutter including a shutter casing, a blade ring oscillatably mounted therein, shutter blades movably attached thereto and mechanism for operating the blades, the combination with said blade ring, shutter blades and operating mechanism, of a tooth-shaped formation on the blade ring, a blade ring opener for moving the blade ring including a single tooth and an abutment spaced therefrom, positioned to both turn with and slide on said blade ring, said single tooth being adapted to engage the tooth-shaped formation on the blade ring when the latter is in a predetermined position to turn therewith, and a handle outside the shutter casing and connected to the blade opener for turning the latter when the blade ring is in a predetermined position in which the tooth-shaped formation of the blade ring and the single tooth of the blade ring opener are in engagement, whereby the shutter blades may be opened independently of the mechanism for operating th shutter, and a light spring tending to turn the blade opener in one direction.

8. In a camera shutter including a shutter casing, a blade ring oscillatably mounted therein, shutter blades movably attached thereto and mechanism for operating the blades, the combination with said blade ring, shutter blades and operating mechanism, of a tooth-shaped formation on the blade ring, a blade opener for moving the blade ring, said opener including a single tooth and an abutment spaced therefrom positioned to both turn with and slide on said blade ring, the single tooth being adapted to engage the tooth-shaped formation on the blade ring when the latter is in a predetermined position to turn therewith, and a handle outside the shutter casing and connected to the blade opener for turning the latter when the blade ring is in said predetermined position with the tooth-shaped formation of the blade ring engaged by the tooth on the blade ring opener, whereby the shutter blades may be opened independently of the mechanism for operating the shutter, said blade opener, tooth, and spaced abutment preventing the handle from turning the blade opener when said blade opener, tooth, and abutment slidably engage the blade ring.

9. In a camera shutter including a shutter casing, a blade ring oscillatably mounted therein, shutter blades operably attached to the blade ring, the combination with said blade ring and shutter blades, of a power-driven shutter mechanism operating device, a manually operable blade opener, means for setting the power-driven shutter mechanism, a tooth and a spaced abutment carried by the blade ring opener, a tooth-like formation carried by the blade ring, said blade ring being movable and having a set position and a position of rest, said tooth-like formation on the blade ring and the tooth on the blade opener causing the blade opener and blade ring to turn together as the blade ring moves about its set position and said blade ring abutment and tooth slidably engaging the blade ring when said blade ring moves about its rest position, and a handle on the blade ring opener operable only when the tooth-like formation on the blade ring and the tooth on the blade opener are in an interengaging position in which movement is transmitted from one to the other.

CARL C. FUERST.